US 8,554,946 B2

(12) United States Patent
Runeson et al.

(10) Patent No.: US 8,554,946 B2
(45) Date of Patent: Oct. 8, 2013

(54) NAT TRAVERSAL METHOD AND APPARATUS

(75) Inventors: Stefan Runeson, Lund (SE); Thorsten Herber, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 479 days.

(21) Appl. No.: 12/419,369

(22) Filed: Apr. 7, 2009

(65) Prior Publication Data
US 2010/0094978 A1 Apr. 15, 2010

Related U.S. Application Data

(60) Provisional application No. 61/104,874, filed on Oct. 13, 2008.

(51) Int. Cl.
*G06F 15/16* (2006.01)
(52) U.S. Cl.
USPC ............ 709/238; 709/242; 709/245; 709/249
(58) Field of Classification Search
USPC ................................. 709/238, 242, 245, 249
See application file for complete search history.

(56) References Cited

U.S. PATENT DOCUMENTS

| | | | |
|---|---|---|---|
| 7,328,280 B2 | 2/2008 | Takeda et al. | |
| 2004/0044778 A1* | 3/2004 | Alkhatib et al. | 709/228 |
| 2004/0125801 A1 | 7/2004 | Nawata | |
| 2005/0281260 A1* | 12/2005 | Swanson et al. | 370/389 |
| 2006/0182100 A1 | 8/2006 | Li et al. | |
| 2006/0215684 A1 | 9/2006 | Capone | |
| 2007/0047585 A1* | 3/2007 | Gillespie et al. | 370/475 |
| 2007/0076729 A1 | 4/2007 | Takeda | |
| 2007/0160034 A1* | 7/2007 | Koretsky | 370/352 |
| 2007/0214232 A1 | 9/2007 | Belimpasakis et al. | |
| 2008/0062993 A1 | 3/2008 | Levy et al. | |
| 2008/0225888 A1* | 9/2008 | Valluri et al. | 370/466 |
| 2008/0301215 A1 | 12/2008 | Wang | |
| 2008/0317020 A1 | 12/2008 | Horne | |
| 2009/0177797 A1* | 7/2009 | Rodriguez-Val et al. | 709/245 |

FOREIGN PATENT DOCUMENTS

WO 2005/029877 A2 3/2005

OTHER PUBLICATIONS

Srisuresh, P. et al. "State of Peer-to-Peer (P2P) Communication Across Network Address Translators (NATs)." IETF Network Working Group, Request for Comments: 5128, Mar. 2008.
Schulzrinne et al., "RFC 2326: Real Time Streaming Protocol (RTSP)," IETF Standard, Apr. 1998, pp. 1-92, Internet Engineering Task Force (IETF).

* cited by examiner

*Primary Examiner* — Djenane Bayard
(74) *Attorney, Agent, or Firm* — Coats and Bennett PLLC

(57) ABSTRACT

According to an embodiment of network address translation traversal, a server agent interfaces a private network to a public network. Private IP addresses for servers located in the private network are mapped to corresponding identifiers known to clients located outside the private network. A request message sent over the public network by a client located outside the private network is received by the server agent. The request message includes a host identifier having a first portion that identifies the server agent to the public network and a second portion that identifies a server located in the private network. The second portion of the host identifier is unknown to the public network. The request message is sent to the server identified by the second portion of the host identifier using the private IP address that maps to the second portion of the host identifier.

23 Claims, 5 Drawing Sheets

GET /myhomepage.html HTTP/1.1
User-Agent: Opera/9.52 (Windows NT 6.0; U; en)
Host: 9198541844.ericssonwsa.com
          └──┬──┘└────┬────┘
             302        300

FIG. 3

NAT TRAVERSAL METHOD AND APPARATUS

CROSS REFERENCE TO RELATED APPLICATIONS

This application claims priority benefit under 35 U.S.C. §119(e) from U.S. Provisional Application No. 61/104,874, filed Oct. 13, 2008, which is incorporated herein by reference in its entirety.

TECHNICAL FIELD

The present invention generally relates to NAT (network address translation) traversal, and more particularly relates to NAT traversal for request messages directed to servers located in a private network.

BACKGROUND

NAT involves modifying network address information so that a particular address space can be mapped into a different address space. NAT is typically used in conjunction with network masquerading for hiding an entire address space, usually consisting of private network addresses. The private address space remains hidden, e.g. behind a single public IP address by mapping the private addresses into a single address using a particular set of address translation rules. Outgoing requests generated by clients located in the private network are rewritten by a router upon exiting the private network so that the packets appear to originate from the router.

For example, a client device located in a private network may generate a new HTTP (hyper-text transfer protocol) request such as a Get request. The HTTP request includes the destination address of the host server, the client's private IP address, a desired action, etc. The NAT-enabled router coupling the private network to the public network translates the private IP address of the client to the public IP address of the router and sends the modified packet data onto the public network. The packet data is eventually delivered to the host server with the destination address included in the HTTP request. The HTTP request is delivered to the host server over a TCP connection established between the host server and the NAT-enabled router. In response, the host server generates an HTTP response which identifies the router as the destination device by using the public IP address of the router. The HTTP response is sent over the public network using the same TCP connection previously established. The router receives the HTTP response, maps the destination address to the client's private IP address using the translation rules and sends the packet data to the client.

Thus, NAT enables private network client devices to communicate with server hosts on an external network by changing the source address of outgoing requests to that of the NAT device and relaying responses back to the client device by undoing the address translation. However, NAT leaves the private network ill-suited to host servers because conventional NAT-enabled devices cannot automatically determine which internal server the incoming requests are destined for. Without a known preexisting connection history, conventional NAT-enabled devices are unable to discern one server from another in a private network and thus cannot readily forward incoming requests to the proper server. Some NAT traversal techniques require host servers located in a private network and external client devices to register with a rendezvous server located in the public domain. Some conventional rendezvous servers permit the end devices to discover each other so that the devices can eventually directly communicate. Other rendezvous servers act as a gateway, forwarding messages back and forth between the end devices. In each case, registration with a rendezvous server located in the public domain is required. Other NAT traversal techniques require the end devices to "learn" about each other, e.g. through trial-and-error or more deterministic techniques. However, these techniques do not guarantee success and can be unreliable.

SUMMARY

According to the methods, apparatus and computer-readable media disclosed herein, NAT traversal is enabled by mapping private IP addresses for servers located in a private network to corresponding identifiers known to clients located outside the private network. The identifiers may be phone numbers, aliases, usernames, nicknames or the like for identifying the private servers to the clients. The identifiers are not known to the public network, and thus cannot be used to route requests generated by the clients to the private network. Instead, requests are routed to the private network using a public IP address for a server agent that resides at the interface between the private network and a public network. Each request includes a host identifier having a public portion that identifies the server agent to the public network and a private portion that identifies a server located in the private network. The private portion of the host identifier is unknown to the public network, and thus the request message can not be routed according to conventional techniques. Instead, the server agent compares the private portion of the host identifier to the identifiers included with the mapping information. The server agent uses the private IP address associated with the matching entry to send the request to the proper server located in the private network. The server can then respond to the originating client through the server agent, the server agent acting as a gateway between the private server and the external client.

According to one embodiment, a network apparatus is configured to interface a private network to a public network. The network apparatus comprises a server agent operable to access a mapping of private IP addresses for servers located in the private network to corresponding identifiers known to clients located outside the private network. The server agent is also operable to receive a request message sent over the public network by a client located outside the private network. The request message includes a host identifier having a first portion that identifies the server agent to the public network and a second portion that identifies a server located in the private network. The second portion of the host identifier is unknown to the public network. The server agent further operable to send the request message to the server identified by the second portion of the host identifier using the private IP address that maps to the second portion of the host identifier.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 3 illustrates an embodiment of an HTTP request processed by the server agent of FIGS. 1 and 2.

DETAILED DESCRIPTION

Figure 1:
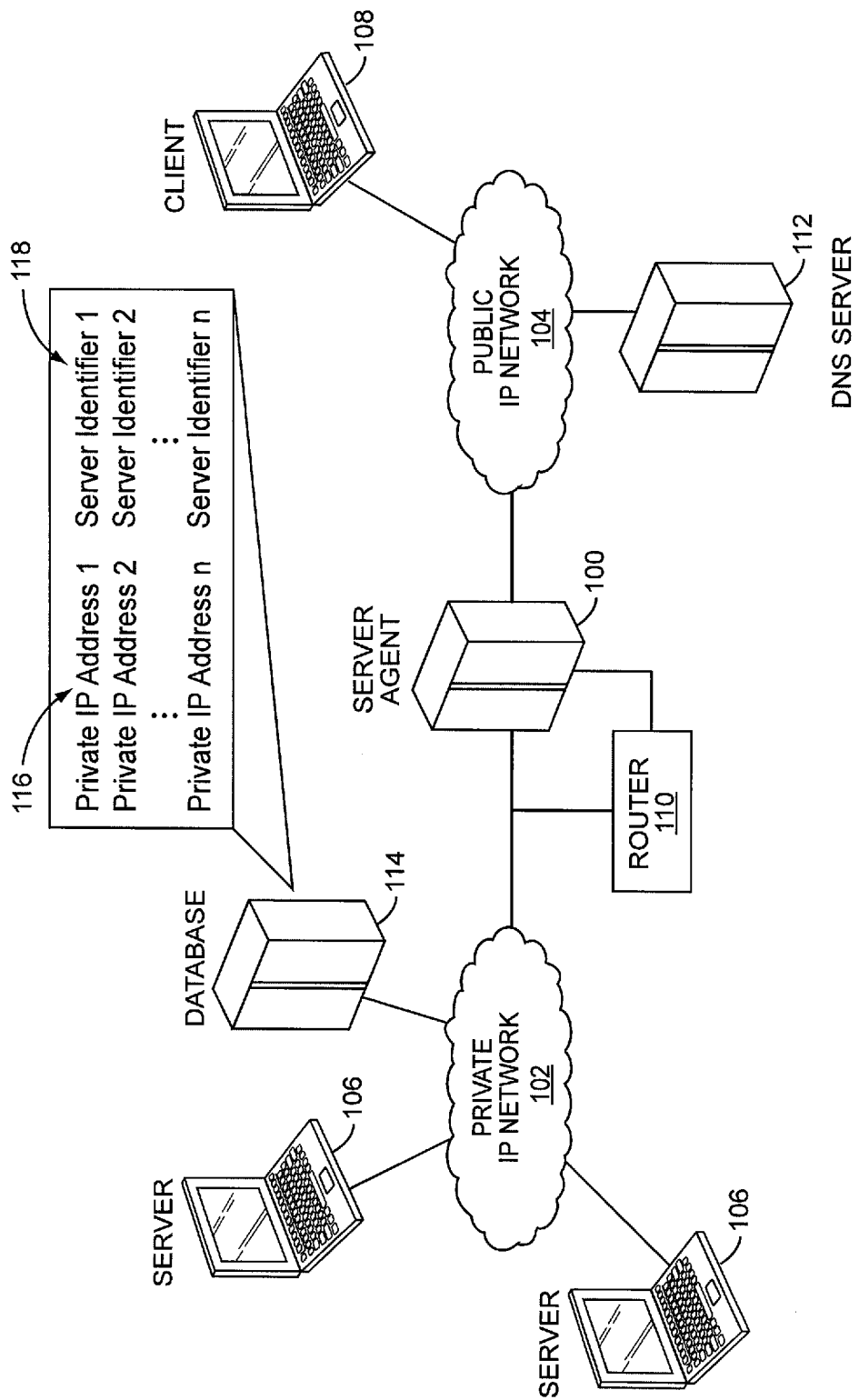
FIG. 1 illustrates a block diagram of an embodiment of a server agent that interfaces a private network to a public network.

FIG. 1 illustrates an embodiment of a server agent 100 that interfaces a private network 102 to a public network 104, e.g. such as the Internet. The server agent 100 enables host servers 106 located in the private network 102 to respond to requests generated by clients 108 located outside the private network 102. Such requests can result from client-server or peer-to-peer communication. The server agent 100 enables communication between the private host servers 106 and the external clients 108. The server agent 100 can be included in or associated with any type of network apparatus such as a web server, NAT-enabled router, etc. In one embodiment, the server agent 100 is co-located with a NAT-enabled router 110. The server agent 100 can be implemented in hardware, software, firmware any combination thereof. In each case, incoming requests sent over the public network 104 by the external clients 108 are directed to the server agent 100 for processing.

The private IP addresses or 'host names' of the servers 106 located in the private network 102 are mapped to the public IP address of the server agent 100 in the DNS (domain name system) on the public IP network 104. This way, requests generated by the external clients 108 can be routed over the public network 104 to the server agent 100 using any type of packet routing technique. In more detail, requests generated by the external clients 108 have a host identifier that identifies the server agent 100 by its public IP address. A DNS server 112 on the public network 104 is used to aid in routing the requests to the server agent 100 based on this portion of the host identifier. The host identifier in each client request also has a second portion that identifies the destination server 106 in the private network 102. However, the second portion of the host identifier is unknown to the public network 104 and cannot be used by the DNS server 112 to route requests.

In one embodiment, the private network 102 is a cellular network and the second portion of the host identifier is a phone number, ESN (electronic serial number) or MSISDN (mobile subscriber integrated services digital network number) associated with the desired mobile phone 'server' 106. Alternatively, the second portion of the host identifier can be an alias, username, nickname or the like and depends on the type of private network 102, e.g. cellular, enterprise, etc.

In one embodiment, a request generated by one of the external clients 108 is an HTTP request routed to the server agent 100 via a TCP (transmission control protocol) connection established between the client 108 and the server agent 100. The client 108 typically initiates setup of the TCP connection. Upon receipt of the HTTP request, the server agent 100 identifies the second portion of the host identifier included in the request. The server agent 100 then accesses a database 114 that maps the private IP addresses 116 of the servers 106 to corresponding identifiers 118. In one embodiment, the private network 102 is a cellular network and the database 114 is a RADIUS database (remote authentication dial in user service), LDAP database (lightweight directory access protocol) or any other type of database. The server agent 100 searches the database 114 for the identifier 118 (e.g., phone number, ESN, MSISDN, alias, username, nickname, etc.) that matches the second portion of the host identifier. The private IP address 116 associated with the matching entry is used by the server agent 100 to send the incoming request to the proper host server 106, e.g. by replacing the host identifier with the private IP address and routing the request based on the private IP address. The request is then sent from the server agent 100 to the proper host server 106 via a second communication connection established between the server agent 100 and the private server 106. In one embodiment, the second connection is also a TCP connection. The server agent 100 typically initiates setup of the second TCP connection. As such, the server agent 100 maintains two separate connections in response to an original incoming request. One connection is formed between the server agent 100 and the originating client 108. The second connection is formed between the server agent 100 and the corresponding private server 106.

The server 106 processes the request received from the server agent 100 and sends a response back to the client 108. The server 106 can reside on any type of electronic device such as a mobile phone, hand-held electronic device, computer, application server, etc. The response generated by the private server 106 includes the private IP address of the private server 106 for identifying the server 106 as the source device. The server 106 sends the response to the server agent 100 over the connection established between the server 106 and the server agent 100. The server agent 100 replaces the private IP source address of the host server 106 with the public IP address of the server agent 100 and sends the response over the public network 104 for routing to the client 108 over the preexisting connection established between the server agent 100 and the client 108. As such, the server agent 100 functions as a type of gateway, permitting servers 106 located in the private network 102 to host applications for external clients 106 even though the clients 106 are effectively unaware of the servers 106.

Figure 2:
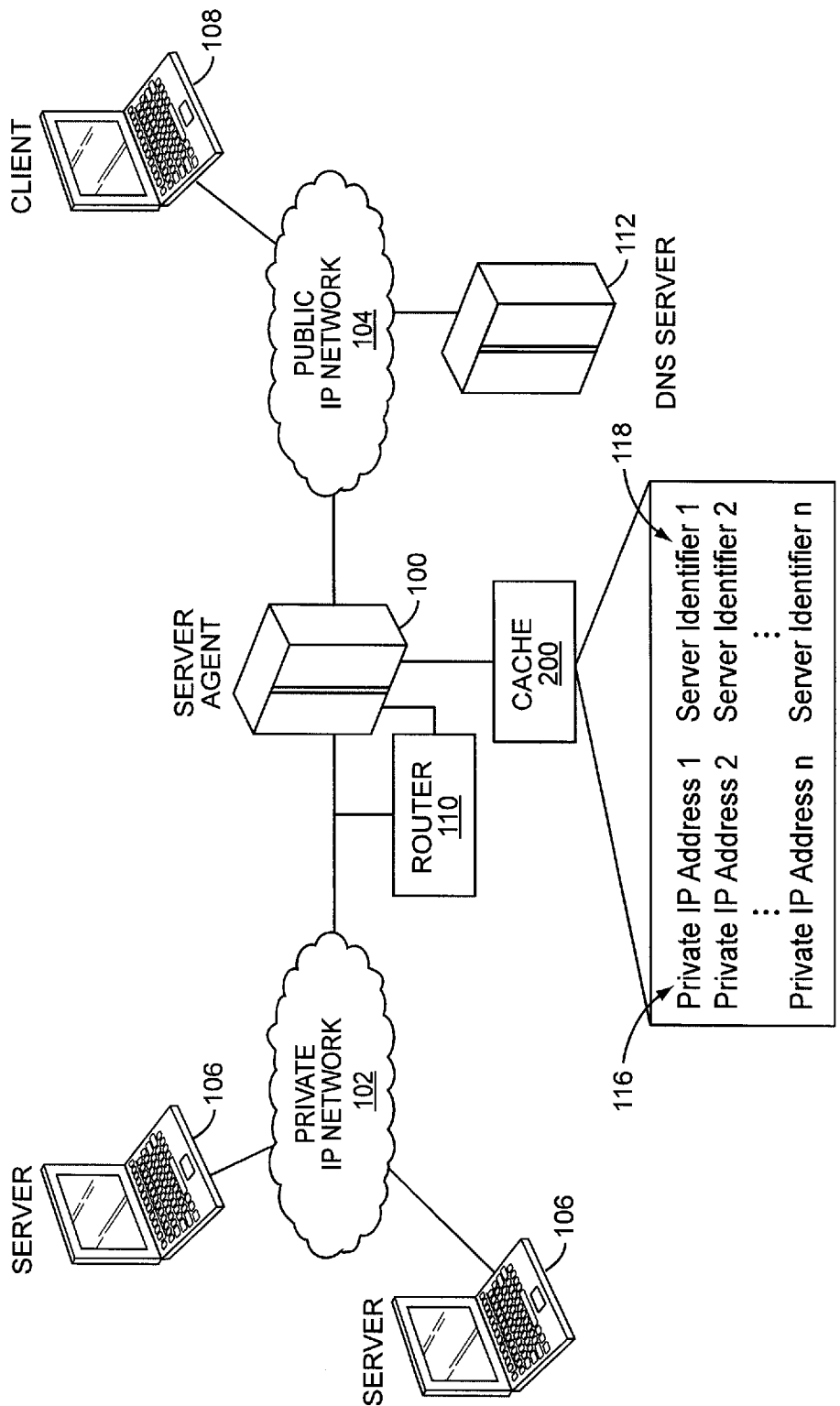
FIG. 2 illustrates a block diagram of another embodiment of a server agent that interfaces a private network to a public network.

FIG. 2 illustrates another embodiment of the server agent 100. According to this embodiment, the mapping of private IP addresses 116 of the servers 106 to corresponding identifiers 118 is maintained in a local cache memory 200 included in or associated with the server agent 100. In response to an incoming request generated by an external client 108, the server agent 100 accesses the cache 200 which maps the private server IP addresses 116 to corresponding identifiers 118. The server agent 100 searches the cache 200 for the identifier 118 that matches the second portion of the host identifier in the incoming request. The private IP address 116 associated with the matching cache entry is used by the server agent 100 to send the incoming request to the proper host server 106.

The embodiment illustrated in FIG. 2 is well-suited for private networks 102 that do not contain many servers 106 or which limit the number of servers 106 to which external clients 108 have access. This configuration is also well-suited for private networks 102 that have static servers 106, i.e. servers that are always active or available and do not change IP addresses. Accordingly, there are fewer private IP addresses 116 to map and/or the mapping is relatively static and does not change often. As such, the private IP address-to-identifier mapping can be maintained in the local cache memory 200 which is closely coupled with the server agent 100. The local cache 200 can be volatile or non-volatile and programmed once or periodically re-programmed in response to changing network conditions. The database 114 shown in the embodiment of FIG. 1 is well-suited for private networks 102 having a large number of private servers 106 available to external clients 108 such as enterprise networks or networks having servers 106 whose availability changes dynamically such as cellular networks. In each embodiment, the server agent 100 routes incoming requests to the proper host server 106 based on the private IP address-to-identifier mapping described herein.

FIG. 3 illustrates an embodiment of an HTTP request generated by a client 108 external to the private network 102. According to this embodiment, the HTTP request is a Get message. However, other types of HTTP requests may be generated by the client 108. The HTTP Get message includes a host identifier having a first portion 300 that identifies the server agent 100 to the public network 104 and a second portion 302 that identifies a server 106 located in the private network 102. The second portion 302 of the host identifier in this exemplary embodiment is a phone number (9198541844). Accordingly, the private IP network 102 is a cellular network with the servers 106 being included in mobile phones. The host names of the HTTP servers 106 in the mobile phones could be "msisdn.operator.com" where 'msisdn' is the MSISDN number that uniquely identifies a subscription in a GSM (global system for mobile communications) or UMTS (universal mobile telecommunications system) cellular network. However, other host identifiers may be used as described previously herein. The second portion 302 of the host identifier is unknown to the public network 104 and thus cannot be used by the DNS server 112 to route requests to the server agent 100.

Figure 4:
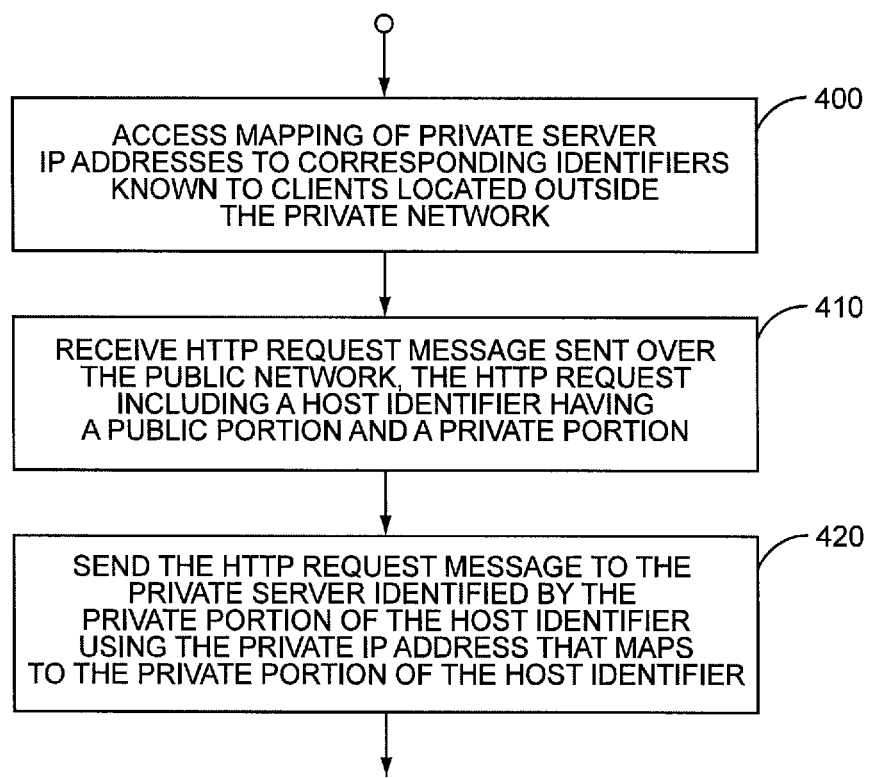
FIG. 4 illustrates an embodiment of a method for traversing network address translation by the server agent of FIGS. 1 and 2.

FIG. 4 illustrates an embodiment of a method for sending the HTTP Get message of FIG. 3 to the private server 106 identified by the second portion 302 of the host identifier. The method begins by mapping the private IP addresses 116 for the servers 106 located in the private network 102 to corresponding identifiers 118 known to the clients 108 located outside the private network 102 (Step 400). In one embodiment, the database 114 illustrated in FIG. 1 performs the mapping. In another embodiment, the cache memory 200 illustrated in FIG. 2 maintains the mapping information. In each embodiment, the HTTP request is sent over the public network 104 by the external client 108 and received at the server agent 100 (Step 410). According to the exemplary embodiment shown in FIG. 3, there is a mapping from "*.operator.com" to the public IP address of the HTTP server agent 100 in the DNS on the public IP network 104. This way, the DNS server 112 can use the first portion 300 of the host identifier to route the HTTP request message over the public network 104 to the server agent 100 based on the public IP address portion 300 of the host identifier (e.g., ericssonwsa.com). The server agent 100 then either queries the database 114 or searches the cache memory 200 for the identifier 118 that matches the second portion 302 of the host identifier (e.g., 9198541844). The server agent 100 sends the HTTP Get message to the server 106 having the private IP address 116 that maps to the second portion 302 of the host identifier (Step 420).

Figure 5:
FIG. 5 illustrates an embodiment of an RTSP request processed by the server agent of FIGS. 1 and 2.

FIG. 5 illustrates an embodiment of an RTSP (real-time streaming protocol) request generated by a client 108 external to the private network 102. According to this embodiment, the RTSP request is a Describe message relating to a streaming media application. However, other types of RTSP request messages may be generated by the client 108. Like the HTTP Get message of FIG. 3, the RTSP Describe message also includes a host identifier having a first portion 500 that identifies the server agent 100 to the public network 104 and a second portion 502 that identifies a server 106 located in the private network 102. The second portion 502 of the host identifier in this exemplary embodiment is also a phone number (9198541844). Accordingly, the private IP network 102 is a cellular network with the servers 106 included in mobile phones and the host names of the RTSP servers 106 in the mobile phones could be "msisdn.operator.com." However, other host identifiers may be used as described previously herein. The second portion 502 of the host identifier is unknown to the public network 104. The RTSP Describe message is sent to the proper private RTSP server 106 based on the mapping information maintained by the database 114 or cache memory 200 in accordance with the method of FIG. 4 as previously described herein.

The server agent 100 embodiments described herein provide transparent access from a public IP network to servers on private IP networks. In this way, web servers, web services and other HTTP based servers or other types of servers such as RTSP servers on a private IP network may be exposed on the Internet. Those skilled in the art can implement various portions of the description, block diagrams and operational flows described herein in the form of computer-executable instructions, which may be embedded in one or more forms of computer-readable media. As used herein, computer-readable media may be any media that can store or embody information that is encoded in a form that can be accessed and understood by a computing device. Typical forms of computer-readable media include, without limitation, both volatile and nonvolatile memory, data storage devices, including removable and/or non-removable media, and communication media. The database 114 and local cache memory 200 can include any or all of these types of other types of computer-readable media.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A network apparatus comprising a server agent configured to:
    connect a private network to a public network;
    access a mapping of private Internet Protocol (IP) addresses for servers on the private network to corresponding identifiers known to clients located outside the private network;
    receive a request message from a client located outside the private network, the request message being received via the public network over a first connection, the request message including a host identifier having a first portion that identifies the server agent to the public network and a second portion that identifies a selected server on the private network, the second portion of the host identifier being unknown to the public network;
    responsive to the request message, set up a second connection to the selected server on the private network, with no intermediate NAT router being included between the network apparatus and the selected server over the second connection; and
    send, over the second connection, the request message to the selected server identified by the second portion of the host identifier using the private IP address that maps to the second portion of the host identifier.

2. The network apparatus of claim 1, wherein the client is a Real-Time Streaming Protocol (RTSP) client, the selected server identified by the second portion of the host identifier is an RTSP server and the request message is an RTSP request message.

3. The network apparatus of claim 2, wherein the host identifier is included in a Uniform Resource Locator (URL) field of the RTSP request message.

4. The network apparatus of claim 1, wherein the client is a Hypertext Transfer Protocol (HTTP) client, the selected server identified by the second portion of the host identifier is an HTTP server and the request message is an HTTP request message.

5. The network apparatus of claim 4, wherein the first and second connections are Transmission Control Protocol (TCP) connections.

6. The network apparatus of claim 5, wherein the server agent is operable to send the HTTP request message received from the HTTP client over the first TCP connection to the HTTP server over the second TCP connection and send an HTTP response message received from the HTTP server over the second TCP connection to the HTTP client over the first TCP connection.

7. The network apparatus of claim 4, wherein the host identifier is included in a host header portion of the HTTP request message.

8. The network apparatus of claim 1, wherein the private network is a cellular network and the private IP addresses for the servers located in the private network are mapped to corresponding phone numbers.

9. The network apparatus of claim 1, wherein the mapping of the private IP addresses to the corresponding identifiers is maintained in a database accessible by the server agent.

10. The network apparatus of claim 1, wherein the mapping of the private IP addresses to the corresponding identifiers is stored in a cache memory of the server agent.

11. The network apparatus of claim 1, wherein the server agent is co-located with a network address translation-enabled router within the network apparatus.

12. A method of traversing network address translation by a server agent within a network apparatus, the method comprising:
    connecting a private network to a public network;
    mapping private Internet Protocol (IP) addresses for servers on the private network to corresponding identifiers known to clients located outside the private network;
    receiving a request message from a client located outside the private network, the request message being received via the public network over a first connection, the request message including a host identifier having a first portion that identifies the server agent to the public network and a second portion that identifies a selected server on the private network, the second portion of the host identifier being unknown to the public network;
    responsive to the request message, setting up a second connection to the selected server on the private network, with no intermediate NAT router being included between the network apparatus and the selected server over the second connection; and
    sending, over the second connection, the request message to the selected server identified by the second portion of the host identifier using the private IP address that maps to the second portion of the host identifier.

13. The method of claim 12, wherein the client is a Real-Time Streaming Protocol (RTSP) client, the selected server identified by the second portion of the host identifier is an RTSP server and the request message is an RTSP request message.

14. The method of claim 13, wherein the host identifier is included in a Uniform Resource Locator (URL) field of the RTSP request message.

15. The method of claim 12, wherein the client is a Hypertext Transfer Protocol (HTTP) client, the selected server identified by the second portion of the host identifier is an HTTP server and the request message is an HTTP request message.

16. The method of claim 15, wherein the first and second connections are Transmission Control Protocol (TCP) connections.

17. The method of claim 16, comprising:
    sending the HTTP request message received from the HTTP client over the first TCP connection to the HTTP server over the second TCP connection; and
    sending an HTTP response message received from the HTTP server over the second TCP connection to the HTTP client over the first TCP connection.

18. The method of claim 15, wherein the host identifier is included in a host header portion of the HTTP request message.

19. The method of claim 12, wherein the private network is a cellular network and the private IP addresses for the servers located in the private network are mapped to corresponding phone numbers.

20. The method of claim 12, comprising mapping the private IP addresses to the corresponding identifiers in a database accessible by the server agent.

21. The method of claim 12, comprising mapping the private IP addresses to the corresponding identifiers in a cache memory of the server agent.

22. The method of claim 12, comprising co-locating the server agent with a network address translation-enabled router within the network apparatus.

23. One or more non-transitory computer-readable media containing executable instructions that, when executed, cause a server agent within a network apparatus to:
    connect a private network to a public network;
    access a mapping of private IP addresses for servers on the private network to corresponding identifiers known to clients located outside the private network;
    receive a request message from a client located outside the private network, the request message being received via the public network over a first connection, the request message including a host identifier having a first portion that identifies the server agent to the public network and a second portion that identifies a selected server on the private network, the second portion of the host identifier being unknown to the public network;
    responsive to the request message, set up a second connection to the selected server on the private network, with no intermediate NAT router being included between the network apparatus and the selected server over the second connection; and
    send, over the second connection, the request message to the selected server identified by the second portion of the host identifier using the private IP address that maps to the second portion of the host identifier.

* * * * *

UNITED STATES PATENT AND TRADEMARK OFFICE
CERTIFICATE OF CORRECTION

| | | |
|---|---|---|
| PATENT NO. | : 8,554,946 B2 | Page 1 of 1 |
| APPLICATION NO. | : 12/419369 | |
| DATED | : October 8, 2013 | |
| INVENTOR(S) | : Runeson et al. | |

It is certified that error appears in the above-identified patent and that said Letters Patent is hereby corrected as shown below:

In the Specifications

In Column 4, Line 37, delete "clients 106 even" and insert -- clients 108 even --, therefor.

In Column 4, Line 37, delete "clients 106 are" and insert -- clients 108 are --, therefor.

Signed and Sealed this
Twenty-ninth Day of April, 2014

Michelle K. Lee
*Deputy Director of the United States Patent and Trademark Office*